United States Patent [19]
Young

[11] Patent Number: 6,096,414
[45] Date of Patent: Aug. 1, 2000

[54] HIGH DIELECTRIC STRENGTH THERMAL INTERFACE MATERIAL

[75] Inventor: Kent M. Young, Carlisle, Mass.

[73] Assignee: Parker-Hannifin Corporation, Cleveland, Ohio

[21] Appl. No.: 08/978,493

[22] Filed: Nov. 25, 1997

[51] Int. Cl.[7] ........................................................ B32B 5/16
[52] U.S. Cl. .................... 428/220; 428/329; 428/447; 524/430; 524/444; 442/117; 442/180
[58] Field of Search ................................... 428/213, 215, 428/328, 329, 447, 220; 524/430, 444; 442/117, 180

[56] References Cited

U.S. PATENT DOCUMENTS

| | | | |
|---|---|---|---|
| 4,566,990 | 1/1986 | Liu et al. | 252/503 |
| 4,596,670 | 6/1986 | Liu et al. | 252/511 |
| 4,654,754 | 3/1987 | Daszkowski | 361/708 |
| 4,842,911 | 6/1989 | Fick | 428/40.4 |
| 4,869,954 | 9/1989 | Squitieri | 442/13 |
| 4,979,074 | 12/1990 | Morley et al. | 361/720 |
| 5,060,114 | 10/1991 | Feinberg et al. | 361/706 |
| 5,137,959 | 8/1992 | Block et al. | 524/430 |
| 5,151,777 | 9/1992 | Akin et al. | 257/712 |
| 5,194,480 | 3/1993 | Block et al. | 524/404 |
| 5,213,868 | 5/1993 | Liberty et al. | 428/131 |
| 5,298,791 | 3/1994 | Liberty et al. | 257/707 |
| 5,309,320 | 5/1994 | Smith | 361/704 |
| 5,510,174 | 4/1996 | Litman | 442/151 |
| 5,545,473 | 8/1996 | Ameen et al. | 428/212 |

OTHER PUBLICATIONS

Reynolds Alumina & Ceramics Laboratory, Analysis of RC–SPT DBM dated Sep., 1996.
General Electric Materials and Applications Resource Guide, (no date).
BFG Industries, Inc. Electronic Fabrics literature dated Sep., 1996.
Alcan Chemicals Product Data dated 1989, (no month).
Parker Seals, Cho–Therm Thermal Interface Materials dated 1993, (no month).

*Primary Examiner*—Blaine Copenheaver
*Assistant Examiner*—John J. Guarriello
*Attorney, Agent, or Firm*—John A. Molnar, Jr.

[57] ABSTRACT

A thermally-conductive, electrically insulative interface for conductively cooling a heat-generating source, such as an electronic component, having an associated thermal dissipation member such as a heat sink. The interface is provided as a cured sheet of a curable material formulated as a blend of a curable silicone binder, and a particulate alumina, i.e., aluminum oxide ($Al_2O_3$), filler. The interface is observed to exhibit a thermal conductivity of at least about 0.8 W/m–K and a wet dielectric breakdown strength of at least about 475 Vac/mil.

10 Claims, 2 Drawing Sheets

HIGH DIELECTRIC STRENGTH THERMAL INTERFACE MATERIAL

BACKGROUND OF THE INVENTION

The present invention relates broadly to a thermal interface material which is interposable between, for example, the heat transfer surfaces of a heat-generating, electronic component and a thermal dissipation member, such as a heat sink or circuit board, for the conductive cooling of the electronic component. More particularly, the invention relates to a thermally conductive, electrically insulative curable composition, and a cured sheet thereof, which is formulated as including a curable silicone binder and a particulate alumina ($Al_2O_3$) filler.

Circuit designs for modem electronic devices such as televisions, radios, computers, medical instruments, business machines, communications equipment, and the like have become increasingly complex. For example, integrated circuits have been manufactured for these and other devices which contain the equivalent of hundreds of thousands of transistors. Although the complexity of the designs has increased, the size of the devices has continued to shrink with improvements in the ability to manufacture smaller electronic components and to pack more of these components in an ever smaller area.

As electronic components have become smaller and more densely packed on integrated boards and chips, designers and manufacturers now are faced with the challenge of how to dissipate the heat which is ohmically or otherwise generated by these components. Indeed, it is well known that many electronic components, and especially power semiconductor components such as transistors and microprocessors, are more prone to failure or malfunction at high temperatures. Thus, the ability to dissipate heat often is a limiting factor on the performance of the component.

Electronic components within integrated circuit traditionally have been cooled via forced or convective circulation of air within the housing of the device. In this regard, cooling fins have been provided as an integral part of the component package or as separately attached thereto for increasing the surface area of the package exposed to convectively-developed air currents. Electric fans additionally have been employed to increase the volume of air which is circulated within the housing. For high power circuits and the smaller but more densely packed circuits typical of current electronic designs, however, simple air circulation often has been found to be insufficient to adequately cool the circuit components.

Heat dissipation beyond that which is attainable by simple air circulation may be effected by the direct mounting of the electronic component to a thermal dissipation member such as a "cold plate" or other heat sink. The heat sink may be a dedicated, thermally-conductive metal plate, or simply the chassis or circuit board of the device. However, beyond the normal temperature gradients between the electronic component and the heat sink, an appreciable temperature gradient is developed as a thermal interfacial impedance or contact resistance at the interface between the bodies.

That is, and as is described in U.S. Pat. No. 4,869,954, the faying thermal interface surfaces of the component and heat sink typically are irregular, either on a gross or a microscopic scale. When the interfaces surfaces are mated, pockets or void spaces are developed therebetween in which air may become entrapped. These pockets reduce the overall surface area contact within the interface which, in turn, reduces the heat transfer area and the overall efficiency of the heat transfer through the interface. Moreover, as it is well known that air is a relatively poor thermal conductor, the presence of air pockets within the interface reduces the rate of thermal transfer through the interface.

To improve the heat transfer efficiency through the interface, a layer of a thermally-conductive, electrically-insulating material typically is interposed between the heat sink and electronic component to fill in any surface irregularities and eliminate air pockets. Initially employed for this purpose were materials such as silicone grease or wax filled with a thermally-conductive filler such as aluminum oxide. Such materials usually are semi-liquid or solid at normal room temperature, but may liquefy or soften at elevated temperatures to flow and better conform to the irregularities of the interface surfaces.

For example, U.S. Pat. No. 4,299,715 discloses a wax-like, heat-conducting material which is combined with another heat-conducting material, such as a beryllium, zinc, or aluminum oxide powder, to form a mixture for completing a thermally-conductive path from a heated element to a heat sink. A preferred wax-like material is a mixture of ordinary petroleum jelly and a natural or synthetic wax, such as beeswax, palm wax, or mineral wax, which mixture melts or becomes plastic at a temperature above normal room temperature. The material can be excoriated or ablated by marking or rubbing, and adheres to the surface on which it was rubbed. In this regard, the material may be shaped into a rod, bar, or other extensible form which may be carried in a pencil-like dispenser for application.

U.S. Pat. No. 4,466,483 discloses a thermally-conductive, electrically-insulating gasket. The gasket includes a web or tape which is formed of a material which can be impregnated or loaded with an electrically-insulating, heat conducting material. The tape or web functions as a vehicle for holding the meltable material and heat conducting ingredient, if any, in a gasket-like form. For example, a central layer of a solid plastic material may be provided, both sides of which are coated with a meltable mixture of wax, zinc oxide, and a fire retardant.

U.S. Pat. No. 4,473,113 discloses a thermally-conductive, electrically-insulating sheet for application to the surface of an electronic apparatus. The sheet is provided as having a coating on each side thereof a material which changes state from a solid to a liquid within the operating temperature range of the electronic apparatus. The material may be formulated as a meltable mixture of wax and zinc oxide.

U.S. Pat. No. 4,764,845 discloses a thermally-cooled electronic assembly which includes a housing containing electronic components. A heat sink material fills the housing in direct contact with the electronic components for conducting heat therefrom. The heat sink material comprises a paste-like mixture of particulate microcrystalline material such as diamond, boron nitride, or sapphire, and a filler material such as a fluorocarbon or paraffin. The greases and waxes of the aforementioned types heretofore known in the art, however, generally are not self-supporting or otherwise form stable at room temperature and are considered to be messy to apply to the interface surface of the heat sink or electronic component. To provide these materials in the form of a film which often is preferred for ease of handling, a substrate, web, or other carrier must be provided which introduces another interface layer in or between which additional air pockets may be formed. Moreover, use of such materials typically involves hand application or lay-up by the electronics assembler which increases manufacturing costs.

Alternatively, another approach is to substitute a cured, sheet-like material or pad for the silicone grease or wax material. Such materials may be compounded as containing one or more thermally-conductive particulate fillers dispersed within a polymeric binder, and may be provided in the form of cured sheets, tapes, pads, or films. Typical binder materials include silicones, urethanes, thermoplastic rubbers, and other elastomers, with typical fillers including aluminum oxide, magnesium oxide, zinc oxide, boron nitride, and aluminum nitride.

Exemplary of the aforesaid interface materials is an alumina or boron nitride-filled silicone or urethane elastomer which is marketed under the name CHO-THERM® by the Chomerics Division of Parker-Hannifin Corp., 77 Dragon Court, Woburn, Mass. 01888. Additionally, U.S. Pat. No. 4,869,954 discloses a cured, form-stable, sheet-like, thermally-conductive material for transferring thermal energy. The material is formed of a urethane binder, a curing agent, and one or more thermally conductive fillers.

The fillers, which may include aluminum oxide, aluminum nitride, boron nitride, magnesium oxide, or zinc oxide, range in particle size from about 1–50 microns (0.05–2 mils).

U.S. Pat. No. 4,654,754 discloses a "thermal link" for providing a thermal pathway between a heat source and a heat sink. In one embodiment, a thermally conductive elastomeric material, such as a silicone filled with silver-copper particles, is formed into a mat having a plurality of raised sections. The raised sections deform under low pressure to conform to the space between the heat source and the heat sink.

U.S. Pat. No. 4,782,893 discloses a thermally-conductive, electrically-insulative pad for placement between an electronic component and its support frame. The pad is formed of a high dielectric strength material in which is dispersed diamond powder. In this regard, the diamond powder and a liquid phase of the high dielectric strength material may be mixed and then formed into a film and cured. After the film is formed, a thin layer thereof is removed by chemical etching or the like to expose the tips of the diamond particles. A thin boundary layer of copper or other metal then is bonded to the top and bottom surfaces of the film such that the exposed diamond tips extend into the surfaces to provide pure diamond heat transfer paths across the film. The pad may be joined to the electronic component and the frame with solder or an adhesive.

U.S. Pat. No. 4,842,911 discloses a composite interfacing for the withdrawal and dissipation of heat from an electronic, solid-state device by an associated heat sink. The interfacing consists of dual layers of a compliant silicone rubber carried on either side of a porous glass cloth. The layers are filled with finely-divided heat-conducting particles which may be formed of alumina or another metal oxide, or an electrically-conductive material such as nickel or graphite. One of the silicone layers is pre-vulcanized, with the other being cured and bonded in place once the interfacing has been applied to the heat sink surface for abutment with the electronic device.

Commonly-assigned U.S. Pat. No. 4,869,954 discloses a form-stable material for use in transferring thermal energy from an electronic component to a heat sink. The material is formulated as the reaction product of a urethane resin and a curing agent, and is filled with one or more thermally conductive fillers such as zinc oxide, aluminum oxide, magnesium oxide, aluminum nitride, or boron nitride. The material may be formed as including a support layer of a glass cloth, plastic mesh or film, or a metal mesh or foil.

U.S. Pat. No. 4,965,699 discloses a printed circuit device which includes a memory chip mounted on a printed circuit card. The card is separated from an associated cold plate by a layer of a silicone elastomer which is applied to the surface of the cold plate.

U.S. Pat. No. 4,974,119 discloses a heat sink assembly which includes an electronic component supported on a printed circuit board in a spaced-apart relationship from a heat dispersive member. A thermally-conductive, elastomeric layer is interposed between the board and the electronic component. The elastomeric member may be formed of silicone and preferably includes a filler such as aluminum oxide or boron nitride.

U.S. Pat. No. 4,979,074 discloses a printed circuit board device which includes a circuit board separated from a thermally-conductive plate by a pre-molded sheet of silicone rubber. The sheet may be loaded with a filler such as alumina or boron nitride.

U.S. Pat. No. 5,060,114 discloses a conformable, gel-like pad having a thermally-conductive filler for conducting heat away from a packaged electronic power device. The pad is formed of a cured silicone resin which is filled with a thermally-conductive material such as aluminum powder, nickel, aluminum oxide, iron oxide, beryllium oxide, or silver. A thin sheet of a thermally-conductive metal such as aluminum is positioned in contact with the surface of the conformable pad for increased thermal transfer.

Commonly-assigned U.S. Pat. No. 5,137,959 discloses a thermally-conductive, electrically insulating interface material comprising a thermoplastic or cross linked elastomer filled with hexagonal boron nitride or alumina. The material may be formed as a mixture of the elastomer and filler, which mixture then may be cast or molded into a sheet or other form.

U.S. Pat. No. 5,151,777 discloses an interface device of thermally coupling an integrated circuit to a heat sink. The device includes a first material, such as copper, having a high thermal conductivity, which is provided to completely surround a plurality of inner core regions. The inner core regions contain a material such as an iron-nickel alloy having a low coefficient of thermal expansion.

Commonly-assigned U.S. Pat. No. 5,194,480 discloses another thermally-conductive, electrically-insulating filled elastomer. A preferred filler is hexagonal boron nitride. The filled elastomer may be formed into blocks, sheets, or films using conventional methods.

Commonly-assigned U.S. Pat. Nos. 5,213,868 and 5,298,791 disclose a thermally-conductive interface material formed of a polymeric binder and one or more thermally-conductive fillers. The fillers may be particulate solids, such as aluminum oxide, aluminum nitride, boron nitride, magnesium oxide, or zinc oxide. The material may be formed by casting or molding, and preferably is provided as a laminated acrylic pressure sensitive adhesive (PSA) tape. At least one surface of the tape is provided as having channels or through-holes formed therein for the removal of air from between that surface and the surface of a substrate such as a heat sink or an electronic component.

U.S. Pat. No. 5,309,320 discloses a "conduction converter" for a printed circuit board having electronic components. The converter includes a body of a thermally conductive dielectric material, such as an alumina-filled RTV silicone, which is molded to the exact configuration of the electronic components. The converter may be clamped intermediate a cold plate and the circuit board to conductively remove heat from the electronic components.

U.S. Pat. No. 5,321,582 discloses an electronic component heat sink assembly which includes a thermally-conductive laminate formed of polyamide which underlies a layer of a boron nitride-filled silicone. The laminate is interposed between the electronic component and the housing of the assembly.

Commonly-assigned U.S. Pat. No. 5,510,174 discloses a thermally-conductive, titanium diboride ($TiB_2$) filler providing improved thermal conductivity at low application pressures. The filler may be incorporated into elastomers, films, and tapes.

U.S. Pat. No. 5,545,473 discloses a thermally conductive interface for electronic components. The interface is formed of an open structure fluoropolymer material such as an expanded polytetrafluoroethylene. Thermally conductive particles, which may be formed of a metal or metal oxide, or another material such as boron nitride, aluminum nitride, diamond powder, or silicon carbide, are attached to portions of the fluoropolymer material.

Sheets or pads of the above-described types have garnered general acceptance for use as interface materials in the conductive cooling of electronic component assemblies. It will be appreciated, however, that further improvements in these types of interface materials would be well-received by the electronics industry. Especially desired would be a low cost alumina-filled silicone material having thermal conductive and electrical insulating properties approaching those of higher cost boron nitride filled materials.

BROAD STATEMENT OF THE INVENTION

The present invention is directed to a thermal interface sheet or pad, and to an alumina-filled silicone material therefor, which exhibits an unexpected convergence of a high dielectric breakdown strength at a relatively high thermal conductivity. Specifically, the interface of the present invention provides for a dielectric breakdown strength of at least about 475 Vac/mil, and preferably greater than about 500 Vac/mil, under both wet and dry conditions, while maintaining a thermal conductivity of greater than about 0.8 W/m–K. Alumina-filled silicone materials, of course, are well-known for use as thermal interfaces, but it is believed that none of the materials heretofore available have showed such a high wet breakdown strength at thermal conductivities approaching 1 W/m–K. Advantageously, the interface material of the present invention retains its relatively high dielectric breakdown strength even under "wet" conditions of high humidity.

Empirically, it is known that the thermal conductivity of an interface material varies in proportion to the filler loading level, and that the dielectric breakdown strength, as a measure of the electrical insulating properties of the material, varies in inverse proportion to such level. Although the thermal and electrical properties of conventional alumina-filled silicone materials could be optimized to suit the intended application, acceptable electrical insulating properties had been achieved at the sacrifice of high thermal conductivity. Accordingly, alumina-filled materials, although relatively inexpensive as compared to boron nitride filled materials, heretofore were considered suitable only for "commercial" uses and other less demanding applications. With the present invention, rather than representing a mere optimization of filler loading level for either higher thermal conductivity or better electrical insulation, a new class of alumina-filled silicone materials is provided having both good thermal properties and electrical performance.

In a preferred embodiment, the thermal interface material of the present invention is formulated as a relatively thin, i.e., 20 mils or less, glass fiber reinforced sheet of a cured silicone binder which is filled with alumina, i.e., aluminum oxide ($Al_2O_3$), particles. The binder preferably is a 2-part, room temperature vulcanizing (RTV) silicone elastomer, with the alumina filler preferably being a mixture of alumina components including a first component having average median particle size ($d_{50}$) of about 15 $\mu$m, an average specific surface area of about 0.3 $m^2/g$, and an average sodium oxide ($Na_2O$) content of about. 0.02% by weight of the first component. The filler may be load at ratio of from about 1:1 to about 1:10, and preferably from about 1:2 to 1:6, by weight of binder to weight of filler. In accommodating a relatively high level of relatively inexpensive alumina filler, the material of the invention may be produced at a relatively low cost but as having excellent thermal and electrical properties. Moreover, in exhibiting a relatively high dielectric breakdown strength, the material of the present invention allows the use of thinner interfaces which, in turn, lowers thermal impedance for improved heat transfer, as well as providing savings in terms of weight and cost.

A feature of the preferred embodiment of the present invention therefore is to provide a thermally conductive, electrically insulative interface provided as a cured pad or other sheet. The sheet is formed of a curable material formulated as a blend of a curable silicone binder, and a particulate alumina ($Al_2O_3$) filler. So formed, the interface is observed to exhibit a thermal conductivity according to ASTM D5470 of at least about 0.8 W/m–K and a dielectric breakdown strength according to ASTM D149 of at least about 475 Vac/mil under all environmental conditions including wet or humid conditions.

Another feature of the preferred embodiment of the present invention is to provided a thermally conductive, electrically insulative curable composition especially adapted for use as a thermal interface material. The composition, which is formulated as a blend of a curable silicone binder and a particulate alumina ($Al_2O_3$) filler, exhibits a thermal conductivity of at least about 0.8 W/m–K and a dielectric breakdown strength when cured of at least about 475 Vac/mil under all environmental conditions including wet or humid conditions.

Yet another feature of the preferred embodiment of the present invention is a method of providing a thermally-conductive, electrically-insulative interface between a heat-generating source having a first heat transfer surface and a thermal dissipation member having a second heat transfer surface. The method involves the steps of forming a cured sheet of a thermally conductive, electrically insulative composition, and interposing the sheet in thermal contact between the first heat transfer surface of the heat-generating source and the second heat transfer surface of the thermal dissipation member. The composition is formulated as a blend of a curable silicone binder, and a particulate alumina ($Al_2O_3$) filler. The sheet has a thermal conductivity of at least about 0.8 W/m–K and a dielectric breakdown strength of at least about 475 Vac/mil under all environmental conditions including wet or humid conditions.

Advantages of the present invention include an alumina-filled, silicone interface material which exhibits an unexpected convergence of thermal and electrical properties, and which retains its electrical insulating properties even under conditions of high ambient moisture. Additional advantages include a low cost alumina thermal material having electrical and thermal properties approaching those of higher cost boron nitride filled materials. Still further advantages include an alumina filled material which allows for the use of thinner interfaces for decreased thermal resistance, weight, and cost. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
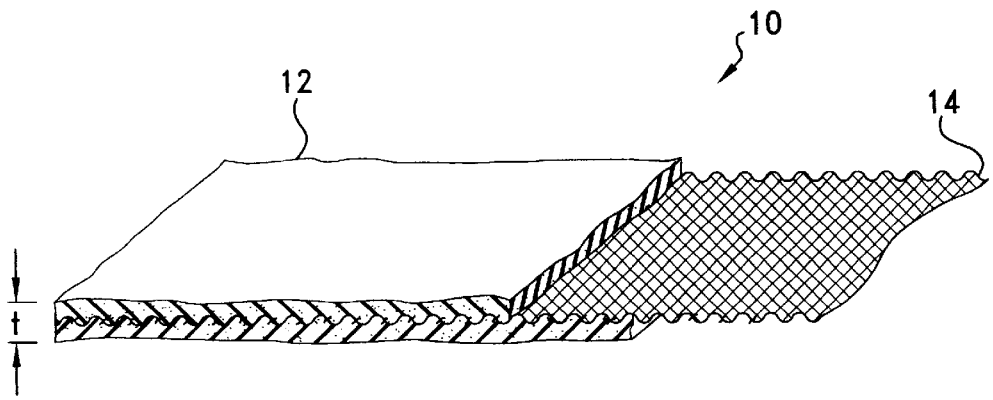
FIG. 1 is a perspective view of one embodiment of the thermal interface material of the present invention as formed into a reinforced sheet, the view being shown with portions being broken away and sectioned to reveal the structure of the sheet.

Referring to the drawings wherein corresponding reference characters indicate corresponding elements throughout the figures, a thermal interface according to the present invention is shown generally at 10 in FIG. 1. Interface 10 is provided as a cured sheet or pad of a layer, 12, of thermally conductive, electrically insulative material which is formulated as a blend of a curable silicone binder, and a particulate filler. In the preferred embodiment illustrated in FIG. 1, sheet 10 includes an optional carrier or reinforcement member, 14, which is incorporated as an interlayer within layer 12. Conventionally, such reinforcement member 14, which improves the physical strength of sheet 10 for handling, die-cutting, and the like, may be provided as a film formed of a thermoplastic material such as a polyimide or, as is shown, a layer of a woven fiberglass fabric or cloth. A preferred material for the reinforcement member is a 0.0021 inch (0.053 mm) thick, 1.38 oz/yd$^2$ (46.8 g/m$^2$) weight fiberglass fabric which is marketed commercially as "Style 1080" by BFG Industries of Greensboro, N.C. With reinforcement member 14, sheet 10 typically will have a thickness, "t", of from about 1–20 mils (25–500 microns), but as may be varied depending upon the requirements of the intended heat transfer application.

The curable silicone binder constituent preferably is provided as a 2-part, room temperature vulcanizing (RTV) reaction system involving a first part of a resin or base component and a second part of curing agent which is also known as a cross-linking agent or hardener. When admixed, conventionally at a ratio of about 10:1 by weight of resin to curing agent, the system cures via a thermal addition polymerization, i.e., a vulcanization or cross-linking, mechanism. By "cure" it is meant that the resin is polymerized, cross-linked, further cross-linked or polymerized, vulcanized, hardened, or otherwise chemically or physically changed from a liquid or other fluent form into a solid polymeric or elastomeric phase. The curing mechanism typically involves a cross-linking reaction of functional group species on adjacent resin molecules which also may be oligomers or polymers. The cross-linking reaction is thermally accelerated and has a cure profile which may include a predefined cure or critical temperature for a given heating time.

Although the reaction may occur between the same or different molecules or functional groups, the preferred system of the invention incorporates a polymeric, silicone-based resin component having a first functional species, such as vinyl groups, and a silicone-based cross-linking agent having a second functional species, such as hydride groups, different from the first functional species but which are reactive therewith. That is, the first and second species exhibit reactive affinity above a certain activation energy level such that a thermally-induced cross-linking reaction is effected at temperatures at or above a particular cure temperature resulting in the curing of the reaction system to form a form-stable, elastomeric material. A metallic catalyst, such as an organometallic platinum catalyst, may be included with the first component to catalyze the thermal addition cross-linking reaction between the first and second functional groups. Generally, from about 5–10 ppm of such catalyst, based on the total weight of the functional species, is included with the first component.

As used herein, the term "elastomeric" is ascribed its conventional meaning of exhibiting rubber-like properties of compliancy, resiliency or compression deflection, low compression set, flexibility, and an ability to recover after deformation, i.e., stress relaxation. As with silicone elastomers in general, the preferred silicone material exhibits properties such as thermal and oxidation resistance over a wide temperature range, and well as resistance to many chemicals and to weather effects, which makes it especially suited for use as a thermal interface material. The material further exhibits excellent electrical properties including resistance to corona breakdown over a wide range of temperatures and humidity. A particularly preferred two-part RTV silicone formulation is manufactured by General Electric Co., Silicone Products Divisions, Pittsfield, Mass. under the tradename "RTV615."

In accordance with the precepts of the present invention, the silicone binder is loaded with a thermally-conductive alumina ($Al_2O_3$) filler constituent to form a curable interface material exhibiting a thermal conductivity of at least about 0.8 W/m-K, as measured according to ASTM D5470 and a wet dielectric breakdown strength of at least about 475 Vac/mil, and preferably greater than about 500 Vac/mil and up to about 800 Vac/mil or more, as measured according to ASTM D149. Advantageously, such filler is selected to be electrically-nonconductive such that interface of the invention additionally may provide an electrically-insulating barrier between, for example, an electronic component and an associated thermal dissipation member. The alumina filler, which may be loaded at ratio of from about 1:1 to about 1:10, and preferably from about 1:2 to 1:6, by weight of binder to weight of filler, further is selected to effect a synergistic convergence of optimal thermal and electrical properties. In a preferred embodiment, the filler is provided as a mixture of up to three different aluminas having complementary physical properties.

A major portion of the alumina mixture of the preferred embodiment of the invention comprises a first component characterized as having an average median particle size, $d_{50}$, of about 15 μm, an average specific surface area of about 0.3 $m^2/g$, and an average sodium oxide sodium oxide content, ($Na_2O$) content of about 0.02% by weight of the first component. Qualitatively, the first component has a relatively low amount of ionic impurities, as measured by $Na_2O$ content, providing good electrical insulating properties, but also a relatively low resin demand as indicated by its specific surface area. That is, the component may be incorporated into the interface material of the invention at a relatively high loading level without an attendant depletion of the silicone material which, in its fluent, pre-cure phase, wets the surface of the alumina. An alumina of the preferred type is sold commercially under the trade designation "Baco MA1 LS Grade" by Alcan Chemicals of Cleveland, Ohio.

As an optional minor second component, the alumina mixture may include an alumina having median particle size, $d_{50}$, of about 8 μm, an average specific surface area of about 0.7 $m^2/g$, and an average sodium oxide sodium oxide content, ($Na_2O$) content of about 0.05% by weight of the second component. Such an alumina is marketed commercially by Alcan Chemicals under the trade designation "C-75RG (Regular Grind)." As an optional minor third component, the alumina mixture further may include an alumina having median particle size, $d_{50}$, of about 1 μm, an average specific surface area of about 3.5 $m^2/g$, and an average sodium oxide sodium oxide content, ($Na_2O$) content of about 0.005% by weight of the second component. Such an alumina is marketed commercially by Malakoff Industries, Inc. of Malakoff, Tex. under the trade designation "RC-SPT-DBM." It will be appreciated that although the alumina of the third component is the ionically purest of the three components, it also is the most resin demanding. In contrast, although the first and second components are less pure ionically, these components are less resin demanding and therefore may be incorporated into the composition at a higher combined loading level. A preferred alumina mixture is formulated as about 75% by weight of the first component, about 10% by weight of the second component, and about 15% by weight of the third component.

In the cured composition, the binder forms a continuous phase into which the thermally-conductive filler is dispersed. The shape of the filler components is not considered critical to the present invention, and may include any shape that is conventionally involved in the manufacture or formulation of alumina materials of the type herein involved including spherical, flakes, platelets, or irregularly-shaped particles. In the preferred formulation, however, the first and third components are provided as spherical or irregularly shaped particles, with the second component provided as flakes or platelets. Likewise, the particle size of the filler is not considered especially critical, and may range from about 0.250–250 μm, with a range of from about 0.250–75 μm being generally preferred, and the size hereinbefore specified for each of the components being particularly preferred.

Although the above-described alumina fillers and mixtures thereof are considered preferred, the addition of other thermally conductive fillers, including aluminas other than those particularly specified, is to be considered within the scope of the invention herein involved. For example, the interface material of the invention may be formulated as including minor amounts of boron nitride, aluminum nitride, magnesium oxide, zinc oxide, silicon carbide, beryllium oxide, and mixtures thereof. Such fillers characteristically exhibit a thermal conductivity of about 25–50 W/m-°K.

Additional thermally-conductive fillers may be included in interlayer 30 to the extent that the thermal conductivity and other physical properties thereof are not overly compromised. As aforementioned, a solvent or other diluent may be employed during compounding to lower the viscosity of the material for improved mixing and delivery. Conventional wetting opacifying, or anti-foaming agents, pigments, flame retardants, and antioxidants also may be added to the formulation depending upon the requirements of the particular application envisioned. The formulation may be compounded in a conventional mixing apparatus.

Figure 2:
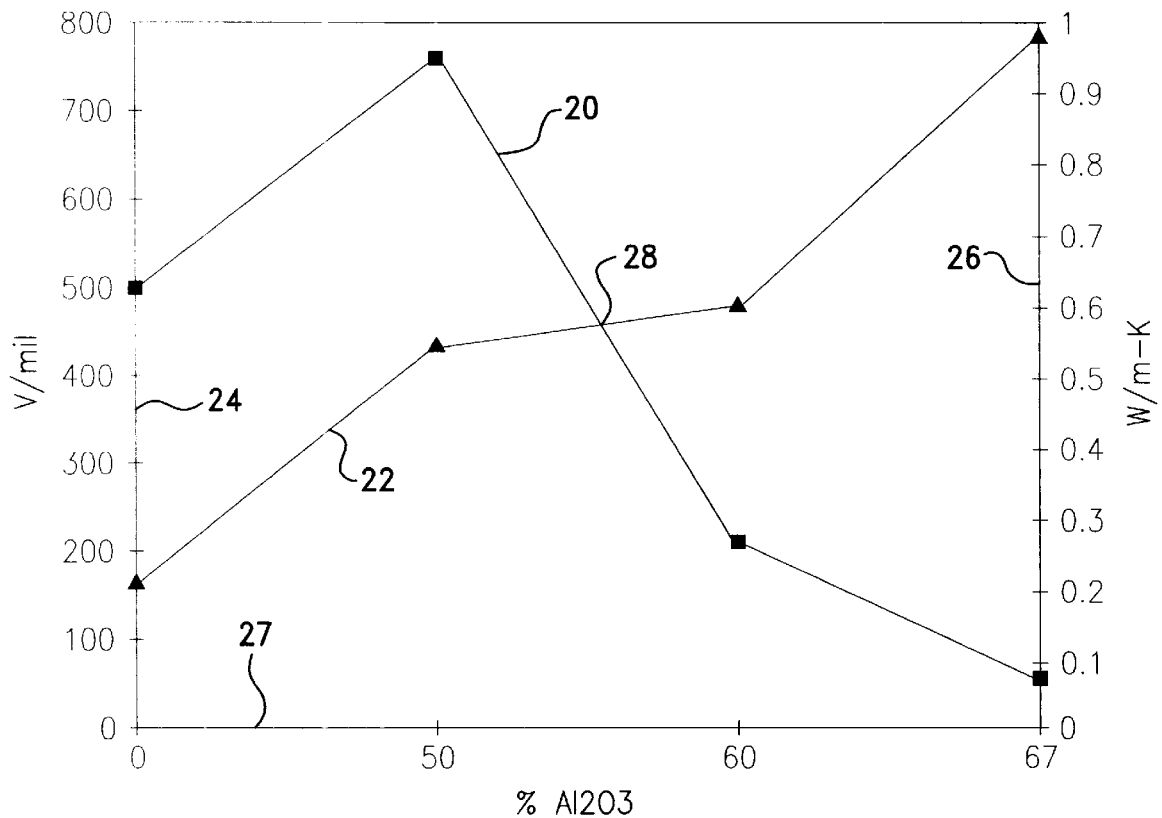
FIG. 2 graphically depicts the influence of filler loading level on the wet voltage breakdown strength and thermal conductivity of a representative an alumina-filled, silicone thermal interface.

As aforementioned, the filler is loaded in a proportion sufficient to provide a convergence of thermal and electrical properties, as characterized by a relatively high dielectric breakdown strength at an unexpectedly high level of thermal conductivity. It of course is known, however, that the thermal conductivity of an interface material varies in proportion to the filler loading level, and that the dielectric breakdown strength, as a measure of the electrical insulating properties of the material, varies in inverse proportion to such level. These relationships are graphically portrayed in FIG. 2 wherein the wet voltage breakdown strength, 20, and thermal conductivity, 22, of a representative alumina-filled (Alcan C75RG), silicone thermal interface material are plotted along the vertical axes referenced at 24 and 26, respectively, as functions of the filler weight percentages plotted along the horizontal axis referenced at 27. As may be seen in the figure, there exists at 28 a cross-over point at which the electrical curve 20 and the thermal curve 22 intersect. Point 28 therefore represents a convergence of optimized thermal and electrical properties. However, rather than being the result of a conventional optimization, the interface material of the present invention instead reveals an unexpected convergence of electrical and thermal properties at values, especially for wet dielectric breakdown strength, which are markedly higher than were heretofore known for alumina-filled silicone materials of the type herein involved.

Further as to the physical properties of the thermal interface material of the present invention, such material typically should exhibit a volume resistivity of at least about $10 \times 10^{14}$ Ω-cm (ASTM D150), a tensile strength of about 1000–15,000 psi (6.9–10.3 MPa) (ASTM D412), an elongation of about 2–10%, a tear strength of about 100 lb/in (17.5 kN/m) (ASTM D624), and a Shore A Hardness of about 90–95 (ASTM D2240). These and other physical properties will vary, of course, with the filler loading level and with the use of optional additives. Additional fillers and additives therefore may be included in the formulation depending upon the requirements of the particular application envisioned and to the extent that the thermal conductivity and electrical properties of the formulation are not overly compromised. Such fillers and additives may include conventional wetting, opacifying, or anti-foaming agents, chain extending oils, tackifiers, pigments, lubricants, stabilizers, flame retardants, and antioxidants. A solvent or other diluent may be employed during the compounding of the formulation to lower the viscosity of the material for improved mixing. In an especially preferred composition, the formulation includes less than about 1%, by total weight of the composition, of a silane coupling agent (Union Carbide A171 Silane, Osi Specialties Inc., Danbury, Conn.) for the improved adhesion of the silicone resin to the filler and reinforcement.

In the production of commercial quantities of the thermal interface material of the present invention, the silicone binder and filler constituents thereof may be compounded under conditions of high shear in a roll mill or other mixer. After compounding, the admixed component may be coated and cured on the reinforcement member 14 or, alternatively, on a release coated treated polyester film or the like to form sheet 10 (FIG. 1) in a conventional manner, for example, by a direct process such as spraying, knife coating, roller coating, casting, drum coating, dipping, or like, or an indirect transfer process. A solvent, diluent, or other vehicle may be incorporated during either compounding or coating to control the viscosity of the mixture. After the coating, the sheet may be dried to flash the solvent and develop an adherent, tack-free layer of the cured thermal material.

For ease of use, sheet 10 advantageously may be provided in a roll or tape form to facilitate its application to a heat transfer surface by an automated process. In this regard, as die cut or otherwise configured to conform to the margins of the associated heat transfer surfaces, sheet 10 may be applied, using a thermally-conductive pressure sensitive adhesive or the like, as a pre-cut pad (FIG. 3), to a length of face stock, release liner, or other carrier film. For the ease of removal of the pad, it is preferred that the carrier is provided as a strip of a waxed, siliconized, or other coated paper or plastic having a relatively low surface energy. Representative carriers include face stocks or other films of plasticized polyvinyl chloride, polyesters, cellulosics, metal foils, composites, and the like.

Figure 3:
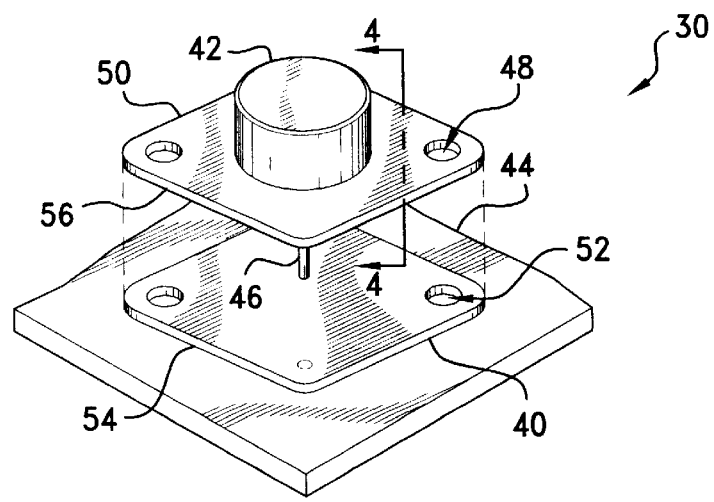
FIG. 3 is a fragmentary, perspective, cross-sectional view of an electrical assembly wherein a heat-generating electronic component thereof is shown in an exploded relationship to an associated thermal dissipation member and wherein a pad of the sheet material of FIG. 1 is shown as interposed between the electronic component and the dissipation member for providing a thermally-conductive, electrically-insulating interface therebetween.

Referring next to FIG. 3, an electrical assembly is shown in an exploded fashion at 30 as including a thermal interface pad, 40, of sheet 10 of the present invention. Assembly 30 further includes a heat-generating digital or analog electronic component, a representative one of which is shown at 42 as supported on an associated thermal dissipation member, 44. Electrical component 12 may be, for example, the power transistor shown, an integrated microchip, microprocessor, or other power semiconductor device, an ohmic or other heat-generating subassembly such as a diode, relay, resistor, transformer, amplifier, diac, or capacitor, or, alternatively, another heat-generating source. Typically, component 42 will have an operating temperature range of from about 60–100° C.

For maintaining the temperature of the component within its operating temperature range, dissipation member 44 is provided as having a heat capacity relative to that of component 42 to be effective in dissipating thermal energy conducted or otherwise transferred therefrom. For purposes of the present illustration, dissipation member 44 is shown as a heat sink or cold plate of a generally planar configuration which is interposed between the electronic component and an associated printed circuit board (PCB) or other substrate. However, dissipation member additionally may include a plurality of cooling fins (not shown) to assist in the convective or forced convective cooling of the electronic component 42, and alternatively may be the PCB itself, as well as a housing or chassis. In either arrangement, a clip, spring, or clamp or the like (not shown) optionally may be provided for applying an additional external force for improving the interface area contact between pad 40 and the mating surfaces of the component and dissipation member.

For the electrical connection of component 42 to its associated PCB, one or more leads or pins, 46, are provided as extending from the component for a soldered or other connection with the board. Mounting holes, one of which is referenced at 48, additionally may be formed within a base portion, 50, of the component 42 for further securing the component to the board or other dissipation member. As may be seen, pad 40 similarly is formed as having a corresponding number of holes or other openings, one of which is referenced at 52, for registration with the pins 46 and mounting holes 48 of the component. Pad 40 additionally is configured as having an outer margin, 54, which is coextensive with the outer margin, 56, of component 42.

Figure 4:
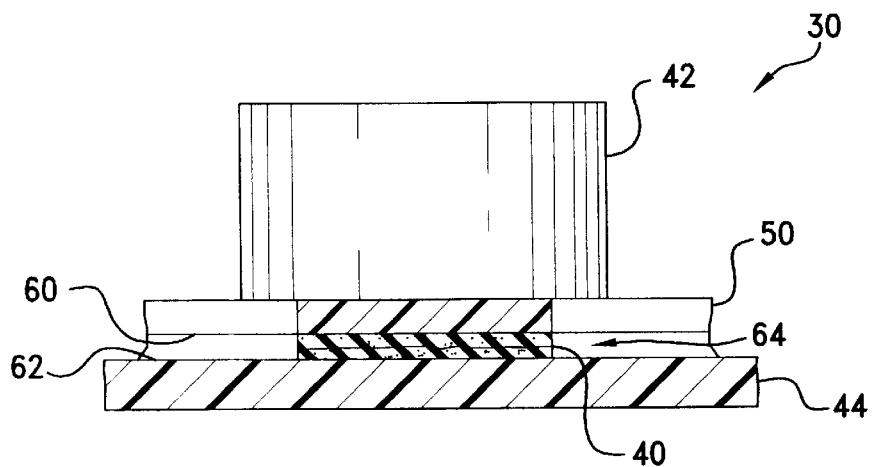
FIG. 4 is an enlarged cross-sectional view of the assembly of FIG. 2 taken through the plane represented by line 4—4 of FIG. 3.

Turning next to FIG. 4 wherein assembly 30 is depicted as assembled with electronic component 42 being supported on dissipation member 44. In the arrangement shown, component 42 presents a first heat transfer surface, 60, which is disposed in a thermal, spaced-apart adjacency with a corresponding second heat transfer surface, 62, of dissipation member 44 to define an interfacing region, 64, therebetween. With pad 40 disposed within interfacing region 64 intermediate heat transfer surfaces 60 and 62, a thermally conductive, electrically insulating interface or pathway thereby is provided for the transfer of thermal energy from component 42 to dissipation member 44. Such interface may be employed without or in conjunction with convective air circulation for effecting the cooling of component 42 and ensuring that the operating temperature thereof is maintained below specified limits. As may be seen in the cross-sectional view portion of FIG. 4, pad 40 both is both complaint and conformable within interfacing region 64 for the exclusion of air pockets or other voids therefrom. That is, pad 40 advantageously improves the efficiency and rate of heat transfer through the interfacing region by filling in the region to provide a generally continuous interface between the component and the dissipation member, and by substantially conforming to the heat transfer surfaces 60 and 62.

The Examples to follow, wherein all percentages and proportions are by weight unless otherwise expressly indicated, is illustrative of the practicing of the invention herein involved, but should not be construed in any limiting sense.

EXAMPLES EXAMPLE 1

Master batches representative of the interface material formulation of the present invention were compounded for characterization according to the following schedule, wherein all proportions are in grams by weight:

TABLE 1

Representative Interface Material Formulations

| | Silicone | | Alumina | | | Additive | | |
|---|---|---|---|---|---|---|---|---|
| Sample | A[1] | B[2] | MA1-LS[3] | C75RG[3] | RC-SPT-DBM[4] | toluene | silane[5] | pigment[6] |
| 1 | 35.4 | 3 | 88.5 | | | | 6 | |
| 2 | 35.4 | 3 | 70.8 | | 23.6 | | 6 | |

TABLE 1-continued

Representative Interface Material Formulations

| | Silicone | | Alumina | | | Additive | | |
|---|---|---|---|---|---|---|---|---|
| Sample | A[1] | B[2] | MA1-LS[3] | C75RG[3] | RC-SPT-DBM[4] | toluene | silane[5] | pigment[6] |
| 3 | 216 | 20 | 590 | 94.4 | 141.6 | 50 | | |
| 4 | 21.6 | 2.0 | 59 | 10.6 | 14.1 | 8 | 0.83 | |
| 5 | 5.5 | 0.51 | 18 | 2.42 | 3.6 | 1.5 | 0.12 | 0.12 |

[1]GE 615A
[2]GE 615B
[3]Alcan
[4]Malakoff
[5]Union Carbide A171
[6]DC LSPRD10, Dow Corning STI, Monroe, CT Each of the Samples were mixed by compounding the alumina fillers with the Part A of the silicone binder and, optionally, the silane additive. The mixing was performed under conditions of high shear and at a temperature which was maintained at less than 40° C. If the silane additive was used, the mixture was allowed to stand at room temperature for a minimum of 18 hours prior to its admixing with the remaining components under conditions of low shear followed by a vacuum degassing. Samples 1, 2, and 4 were coated on a polyester release film (Mylar®, E. I. Du Pont de Nemours & Co., Inc., Wilmington, Del.) with a shimmed knife set to yield a dry thickness of about 13 mils. As needed, toluene was added during compounding or just prior to coating to adjust viscosity. Examples 3 and 5 were coated on Type 1080 fiberglass (BFG Industries, Greensboro, N.C.) by dip coating, and then sized by passage through a gapped opening of about 22 mils. Examples 1–4 each were dried for 10 minutes at 25° C., 10 minutes at 70° C., and 10 minutes at 150° C. Example 5 was dried at 10 minutes at 150° C., 10 minutes at 350° C., and 10 minutes at 375° C.

The thermal and electrical properties of the Samples were determined, respectively, on the basis of thermal impedance, as measured according to ASTM D5470, and dry and wet dielectric breakdown strength, as measured according to ASTM D149. The measurements obtained are reported below in Table 2, and are to be considered characteristic of representative compositions formulated in accordance with the present invention.

TABLE 2

Thermal and Electrical Properties of
Representative Interface Material Formulations

| Material | Dielectric Breakdown Strength (V/mil) | Thermal (°C.-in$^2$/W) |
|---|---|---|
| 1 | 544 (dry) | |
| | 507 (wet) | |
| 2 | 802 (dry) | |
| | 751 (wet) | 0.703 @ 14.2 mils |
| 3 | 655 (dry) | |
| | 632 (wet) | 0.704 @ 17.5 mils |
| 4 | 523 (dry) | |
| | 530 (wet) | 0.546 @ 11.0 mils |
| 5 | 882 (dry) | |
| | 818 (wet) | 0.550 @ 13.0 mils |

These data further confirm that the alumina-filled interface material of the present invention exhibits a relatively high level of electrically insulation, particularly under wet conditions, while retaining a relatively high level of thermal conductivity, i.e., low thermal impedance. It will be appreciated that this characteristically high level of electrical insulation or voltage breakdown affords a correspondingly high level confidence regarding the performance of the interface material of the invention. That is, in service, substantially no dielectric failures or "shorts" are to be expected. This high level of electrical insulation, moreover, allows for the use of thinner interfaces which, in turn, lowers the thermal impedance through the interface for improved heat transfer, and also lowers material costs and weight requirements.

EXAMPLE 2

The thermal and electrical performance of the preferred embodiment of Sample 5 (S5) formulated as described in Example 1 was compared with those of the following conventional interface materials representative of the prior art: Chomerics Cho-Therm® 1674 and 400 ("C1674" and "C400") (Parker Chomerics, Woburn, Mass.); Bergquist 900S and 400 ("B900S" and "B400") (The Bergquist Co., Minneapolis, Minn.); SixPhase SP610 ("SP610") (Six Phase Company, Taipei, Taiwan), Pioneer Si1610 ("Si1610") (Pioneer Company, Taipei, Taiwan); Shin-Etsu TC20CG ("TC20CG") (Shin-Etsu Corp., Torrance, Calif.); and Denka M45 ("M45") (Denka KK, Tokyo, Japan). Except for the Denka M45 material which is believed to be quartz-filled, all of the materials examined are alumina-filled silicones which are reinforced with a fiber glass mesh interlayer. These materials are described and characterized in greater detail in Table 3 which follows.

TABLE 3

Physical Properties of Representative Thermal Interface Materials

| Material No. | Thickness[1] (mils) | Conductivity[2] (W/m-k) | Impedance[3] (C-in$^2$/W) | Resistivity[4] ($\Omega$-cm) | Breakdown[5] (V/mil) |
|---|---|---|---|---|---|
| S5 | 13 | 1.43 | 0.55 | $3 \times 10^{15}$ (dry) | 880 (dry) |
|  |  |  |  | $2 \times 10^{15}$ (wet) | 815 (wet) |
| C1674 | 10.5 | 1.23 | 0.45 | $1.3 \times 10^{13}$ (dry) | 620 (dry) |
|  |  |  |  | $2 \times 10^{11}$ (wet) | 245 (wet) |
| C400 | 8 | (0.70)[6] | (0.40) | $1 \times 10^{15}$ (dry) | 515 (dry) |
|  |  |  |  | $6 \times 10^{12}$ (wet) | 280 (wet) |
| B900S | 8.5 | 0.97 | 0.39 | $4 \times 10^{13-}$ (dry) | 590 (dry) |
|  |  |  |  | $2 \times 10^{13}$ (wet) | 285 (wet) |
| B400 | 9 | (0.9) | n/a | $(1 \times 10^{13})$ (dry) | (555) (dry) |
|  |  |  |  | $(1.5 \times 10^{10})$ (wet) | (280) (wet) |
| SP610 | 18 | 1.23 | 0.68 | $3 \times 10^{14}$ (dry) | 420 (dry) |
|  |  |  |  | $2 \times 10^{12}$ (wet) | 100 (wet) |
| Sil610 | 11.5 | 1.36 | 0.47 | $4 \times 10^{15}$ (dry) | 430 (dry) |
|  |  |  |  | $2 \times 10^{13}$ (wet) | 110 (wet) |
| TC20CG | 7.5 | 1.64 | 0.26 | $1 \times 10^{15}$ (dry) | 600 (dry) |
|  |  |  |  | $7 \times 10^{12}$ (wet) | 275 (wet) |
| M45 | 17.5 | 1.54 | 0.62 | $1 \times 10^{16}$ (dry) | 620 (dry) |
|  |  |  |  | $9 \times 10^{14}$ (wet) | 385 (wet) |

Figure 5:
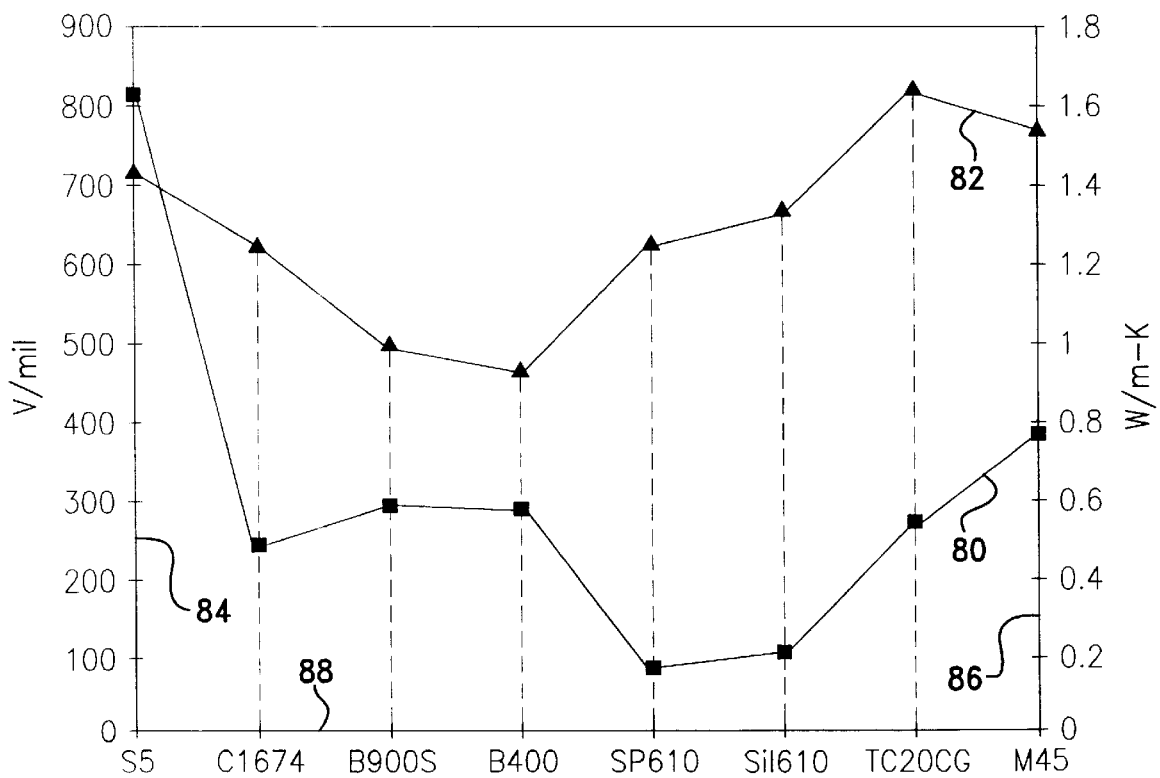
FIG. 5 is a comparative plot of the thermal conductivity and wet voltage breakdown strength of a thermal interface material formulation of the present invention versus representative formulations of the prior art.

[1](ASTM D374)
[2]Thermal Conductivity (ASTM D5470)
[3]Thermal Impedance (ASTM D5740)
[4]Volume Resistivity (ASTM D257)
[5]Voltage Breakdown (ASTM D149)
[6]Parentheticals are literature rather than measured values The thermal conductivity and wet dielectric breakdown strengths reported in Table are plotted in FIG. 5. In FIG. 5, wet voltage breakdown strength, 80, and thermal conductivity, 82, are plotted along the vertical axes referenced at 84 and 86, respectively, for the thermal interface materials which are labeled along the horizontal axis referenced at 88.

The foregoing results confirm that the thermal interface material of the present exhibits an unexpected convergence of thermal and electrical properties, and especially a resistance to electrical shorting under environmental conditions of high ambient humidity, heretofore unknown in the prior art. Importantly, the inventive interface material provides for a dielectric breakdown strength of greater than about 475 or 500 Vac/mil, and preferably greater than about 800 Vac/mil, which strength is not appreciably affected by wet or humid conditions. This is in contrast to the prior art materials which typically exhibit a degradation of electrical insulation capability under wet conditions. The interface material of the invention therefore may be employed in critical service applications and/or in wet or otherwise harsh environments with a higher degree of confidence as compared to conventional alumina-filled materials. The inventive interface material, moreover, exhibits the improved electrical insulating properties while maintaining a relatively high thermal conductivity of at least about 0.8 W/m–K, and preferably about 1 W/m–K or more.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A thermally conductive, electrically insulative interface formed as a sheet comprising:
   (i) a cured silicone binder; and
   (ii) a particulate alumina ($Al_2O_3$) filler dispersed in said binder,
   said interface having a thermal conductivity of at least about 0.8 W/m–K and a wet dielectric breakdown strength of at least about 475 Vac/mil.

2. The interface of claim 1 which comprises about 1:1 to about 1:10 by weight of (i) to (ii).

3. The interface of claim 1 which comprises about 1:2 to about 1:6 by weight of (i) to (ii).

4. The interface of claim 1 wherein said silicone binder comprises a room temperature vulcanizing (RTV) silicone elastomer.

5. The interface of claim 1 wherein said sheet has a thickness of from about 5 mils to about 20 mils.

6. The interface of claim 1 wherein said alumina filler comprises a first alumina component having average median particle size ($d_{50}$) of about 15 $\mu$m, an average specific surface area of about 0.3 m$^2$/g, and an average sodium oxide ($Na_2O$) content of about 0.02% by weight of said first alumina component.

7. The interface of claim 6 wherein said alumina filler further comprises a second alumina component formed of platelets having average median particle size ($d_{50}$) of about 8 $\mu$m, an average specific surface area of about 0.7 m$^2$/g, and an average sodium oxide ($Na_2O$) content of about 0.05% by weight of said second alumina component.

8. The interface of claim 7 wherein said alumina filler further comprises a third alumina component having average median particle size ($d_{50}$) of about 1 $\mu$m, an average specific surface area of about 3.5 m$^2$/g, and an average sodium oxide ($Na_2O$) content of less than about 0.005% by weight of said third alumina component.

9. The interface of claim 8 wherein said alumina filler comprises, by weight of said filler, about 75% of said first alumina component, about 10% of said second alumina component, and about 15% of said third alumina component.

10. The interface of claim 1 wherein said sheet is reinforced with an interlayer of a glass fiber fabric.

* * * * *